United States Patent
Patel

(10) Patent No.: US 6,579,926 B2
(45) Date of Patent: *Jun. 17, 2003

(54) FIRE RETARDANT POLYPHENYLENE ETHER-ORGANOCLAY COMPOSITION AND METHOD OF MAKING SAME

(75) Inventor: Nirajkumar Patel, Delmar, NY (US)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/439,387

(22) Filed: Nov. 15, 1999

(65) Prior Publication Data

US 2002/0099124 A1 Jul. 25, 2002

(51) Int. Cl.$^7$ .............................. C08K 3/34; C08K 5/521
(52) U.S. Cl. ..................... 524/445; 524/447; 524/449; 524/127
(58) Field of Search .................. 524/412, 445, 524/447, 611, 492, 493, 494, 449; 106/487

(56) References Cited

U.S. PATENT DOCUMENTS

| | | | |
|---|---|---|---|
| 3,257,357 A | | 6/1966 | Stamatoff |
| 3,257,358 A | | 6/1966 | Stamatoff |
| 3,306,874 A | | 2/1967 | Hay |
| 3,383,435 A | * | 5/1968 | Cizer .......................... 524/136 |
| 3,516,959 A | * | 6/1970 | Jonas ....................... 106/18.17 |
| 4,166,812 A | * | 9/1979 | Lee .............................. 524/127 |
| 4,317,761 A | * | 3/1982 | Abolins ....................... 524/445 |
| 4,343,732 A | | 8/1982 | Zama et al. |
| 4,478,970 A | * | 10/1984 | Abolins et al. .............. 524/445 |
| 4,546,126 A | * | 10/1985 | Breitenfellner et al. ..... 524/445 |
| 4,582,866 A | * | 4/1986 | Shain .......................... 524/447 |
| 4,672,086 A | * | 6/1987 | Seiler et al. ................. 524/127 |
| 4,894,415 A | * | 1/1990 | Sasaki et al. ................ 524/492 |
| 4,933,386 A | | 6/1990 | Nitoh et al. |
| 5,019,616 A | * | 5/1991 | Avakian et al. .............. 524/494 |
| 5,204,395 A | * | 4/1993 | Lupinski ..................... 524/445 |
| 5,294,654 A | | 3/1994 | Hellstern-Burnell et al. |
| 5,455,292 A | | 10/1995 | Kakegawa et al. |
| 5,530,052 A | | 6/1996 | Takekoshi et al. |
| 5,561,199 A | | 10/1996 | Nagaoka et al. |
| 5,693,700 A | | 12/1997 | Venkataramani et al. |
| 5,728,765 A | | 3/1998 | Chung et al. |
| 5,770,644 A | | 6/1998 | Yamamoto et al. |
| 5,773,502 A | * | 6/1998 | Takekoshi et al. .......... 524/445 |
| 5,811,470 A | * | 9/1998 | Prindle et al. ................. 524/80 |
| RE36,188 E | | 4/1999 | Gosens et al. |
| 6,228,912 B1 | * | 5/2001 | Campbell et al. ............ 524/141 |
| 6,350,804 B2 | * | 2/2002 | Adedeji et al. .............. 524/445 |

FOREIGN PATENT DOCUMENTS

| | | |
|---|---|---|
| WO | WO 99/43747 | 9/1999 |
| WO | WO 00/61683 | 10/2000 |

OTHER PUBLICATIONS

Foreign Search Report Feb. 12, 2001.

* cited by examiner

Primary Examiner—Peter Szekely

(57) ABSTRACT

Polyphenylene ether (PPE) compositions with good fire and flame-retardant characteristics utilize lower levels of organophosphate fire-retardant, and therefore do not suffer from the drawbacks of previously known fire- and flame-retardant PPE compositions. The compositions include (a) a polymer component containing at least 50% of a polyphenylene ether;

(b) glass reinforcing fibers in an amount sufficient to increase the modulus and strength of the polymer component;

(c) a fire retardant component which is preferably an organophosphate fire retardant;

(d) an organoclay component in an amount effective to enhance the flame-retardant characteristics of the composition; and (e) a mineral component. Other conventional additives utilized in formulation of PPE may be included. The composition is made by mixing the ingredients and compounding into a composition which is suitable for injection molding. This composition can be used in the manufacture of injection molded articles such as electronic components, including television internals such as deflection yokes; printer chassis and plastic pallets.

12 Claims, No Drawings

FIRE RETARDANT POLYPHENYLENE ETHER-ORGANOCLAY COMPOSITION AND METHOD OF MAKING SAME

BACKGROUND OF THE INVENTION

This application relates to a flame-retarded polyphenylene ether (PPE) compositions and to a method of making same.

PPE is a thermoplastic material with high glass transition temperature, high dimensional stability, low specific gravity, hydrolytic stability and good mechanical performance. This combination of properties allows PPE based formulations to be injected molded into products which are used for high heat applications, for example in the automotive, electrical, and construction industries. For some applications, where increased modulus and strength are required, PPE may be reinforced with glass fibers. However, these reinforced PPE formulations have undesirable flammability characteristics. At high temperature or when exposed to flame, glass-filled PPE tends to burn continuously without extinguishing. Because of this, fire-retarded grades of glass-filled PPE (especially those rated UL94 V0) tend to be formulated using a large amount (for example >15% by weight for a rating of UL94 V0 at ¹⁄₁₆th inch thickness) of fire-retardant additives such as phosphorus-containing organic compounds. This increases the cost of the product, and also makes it more difficult to formulate glass fiber-reinforced PPE to meet UL94 V0 fire-retardant standards, because the addition of large amounts of phosphorus-containing organic compounds like resorcinol diphosphate plasticizes the composition and significantly reduces the heat deflection temperature of the formulation.

SUMMARY OF THE INVENTION

The present invention provides PPE compositions with good fire and flame-retardant characteristics, which utilize lower levels of organophosphate fire-retardant and which therefore do not suffer from the drawbacks of previously known fire- and flame-retardant PPE compositions. The compositions comprise (a) a polymer component comprising at least 50% by weight of a polyphenylene ether;

(b) glass reinforcing fibers in an amount sufficient to increase the modulus and strength of the polymer component;

(c) a fire retardant component, preferably comprising an organophosphate fire retardant;

(d) an organoclay component in an amount effective to enhance the flame-retardant characteristics of the composition; and (e) a mineral component. Other conventional additives utilized in formulation of PPE may be included. This composition can be used in the manufacture of injection molded articles such as electronic components, including television internals such as deflection yokes; printer chassis and plastic pallets.

The present invention further provides a method for preparation of a glass-reinforced PPE composition. In accordance with this method, the composition is prepared by compounding a mixture of (a) a polymer component comprising at least 50% by weight of a polyphenylene ether;

(b) glass reinforcing fibers in an amount sufficient to increase the modulus and strength of the polyphenylene ether matrix;

(c) a fire retardant component, preferably comprising an organophosphate fire retardant;

(d) an organoclay component in an amount effective to enhance the flame-retardant characteristics of the composition; and (e) a mineral component., as well as optional other components at elevated temperature to provide a homogenous blend of the materials. This compounding is suitably carried out in a screw type extruder at a temperature of 520 to 620° F., preferably from 540 to 560° F.

DETAILED DESCRIPTION OF THE INVENTION

The PPE compositions of the present invention comprise a polymer component comprising at least 50% by weight of a polyphenylene ether; glass reinforcing fibers in an amount sufficient to increase the modulus and strength of the polyphenylene ether matrix; an organophosphate fire retardant component; an organoclay component in an amount effective to enhance the flame-retardant characteristics of the composition; and a mineral component. These components act synergistically to provide glass-fiber reinforced PPE with good fire and flame-retardant characteristics, which utilize lower levels of organophosphate fire-retardant and which therefore do not suffer from the drawbacks of previously known fire- and flame-retardant PPE compositions.

This synergism is demonstrated in the results of the tests described below in the Examples which are summarized in Tables 1, 3 and 4. In these tests, samples of glass-fiber reinforced PPE without organoclay and with various loadings of organoclay were prepared by compounding in a twin screw extruder. Some of the compositions were prepared with a mineral component (mica) and others without a mineral component. The samples were then injection molded and tested for flame-out time in accordance with the UL protocol for V0 rating.

The experiments indicated that addition of small amounts of organoclay along with a mineral component to fire-retardant glass-fiber reinforced PPE allowed achievement of enhanced fire-retardant performance and compliance with the UL94 V0 standard. Addition of larger amounts of organoclay, or the addition of small amounts of organoclay in the absence of the mineral component resulted in a deterioration of the fire-retardant performance. Thus, it is clear that there is a critical and synergistic combination of ingredients which leads to the improved characteristics of the compositions of the present invention.

The composition of the invention is made from a polymer component in which various fillers and additives are incorporated. As used herein, the term "polymer component" refers to the combined mass of all organic polymers present in the composition. While the polymer component may be 100% of a polyphenylene ether, it may also include other polymers selected to achieve desired properties in the final composition. Thus, the polymer component of the composition comprises at least 50% by weight of one or more species of polyphenylene ether. As used herein, the term "polyphenylene ether" refers to individual polymeric PPE species or to mixtures of polymeric PPE species unless the context indicates otherwise.

PPE useful in the present invention is a polymer having repeat units of the general formula

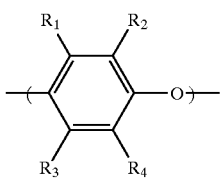

wherein in the formula, $R_1$, $R_2$, $R_3$, and $R_4$ which may be the same or different each represent a member selected from the group consisting of hydrogen atoms, halogen atoms, substituted and unsubstituted alkyl groups and substituted and unsubstituted alkoxy groups. The PPE may be a homopolymer, i.e. the repeat units have the same structural formula, or a copolymer consisting of a combination of two or more types of repeat units where at least one of the $R_1$, $R_2$, $R_3$, and $R_4$ are different for each different repeat unit comprising the copolymer. The polymer is terminated at each end by a monovalent chemical group or atom such as hydrogen, a halogen, a monovalent hydrocarbon radical (saturated, unsaturated or aromatic) or the like. There are no particular restrictions on the method of manufacturing PPE. For example, this may be produced by reacting phenols according to the procedures presented in the specifications of U.S. Pat. Nos. 3,306,874, 3,257,357, or 3,257,358. Examples of these phenols include 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-6-cyclohexylphenol, 2-methyl-6-tolyl)phenol, 2-methyl-6-methoxyphenol, 2-methyl-6-butylphenol, 2,6-dimethoxyphenol, 2,3,6-trimethylphenol, 2,3,5,6-tetramethylphenol, 2,6-diethoxyphenol, etc., but the invention is not limited to these. One may either use a corresponding homopolymer obtained by reacting one of the above substances or a corresponding copolymer obtained by reacting two or more of the above substances and having the different units contained in the above formula. Specific examples of PPE polymers useful in the invention include but are not limited to poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, and poly(2-ethyl-6-propyl-1,4-phenylene) ether. Moreover, an example of the PPE copolymer is a copolymer partially containing an alkyl trisubstituted phenol such as 2,3,6-trimethylphenol in the aforementioned polyphenylene ether repeated unit. The PPE resins may also be copolymers having a styrene compound grafted on. An example of such a styrene-compound-grafted polyphenylene ether is a copolymer obtained by graft polymerization of a styrene compound such as styrene, .alpha.-methylstyrene, vinylstyrene, or chlorostyrene onto the aforementioned PPE.

Additional polymeric materials which may be included, individually or in combination, in the polymer component of the invention include crystalline polystyrene which can be added in amounts of 0 to 50% by weight of the polymer component to improve processability, high impact polystyrene (HIPS), which can be added in amounts of 0 to 50% by weight of the polymer component to improve processability and increase impact strength; EPDM and styrene-butadiene block copolymers which can be added in amounts of 0 to 20% by weight of the polymer component to improve the impact properties of the polymer component; and polyamides such as nylon-6,6 and nylon-6 which can be added in amounts of 0 to 50% by weight of the polymer component to improve melt flow and impart increased resistance to organic solvents. The polymeric component may also include a terpene phenol resin (i.e., a copolymer of monoterpenes and phenol such as NIREZ 2150/7042™) in amounts of 0 to 25% by weight of the polymeric component to provide better flow to the composition. Other polymers that can be blended in the compositions of the invention include polyphenylene sulfides in amounts from 0 to 50% by weight to improve heat deflection temperature and the flow.

Glass fibers suitable for use in the compositions of the invention may be of various lengths appropriate and thicknesses appropriate to the application. Coatings of coupling agents, such as aminosilanes may be employed if desired. The glass fibers are added in an amount sufficient to increase the modulus and the strength of the product by a desired amount, and persons skilled in the art will be able to judge the appropriate levels and type of glass fiber needed to achieve a given result. In general, glass fibers are added in amounts of 5 to 50% by weight.

The fire retardant component of the compositions may be a halogenated fire retardant such as brominated polystyrene. Ecologically-preferred compositions, however, are halogen-free and utilize an organophosphate fire retardant. The organophosphate fire retardant component of the compositions may be any of numerous organophosphorus fire retardants which are known in the art. Specific examples include resorcinol diphosphate, bisphenol A diphosphate, tetraxylyl piperazine diphosphoramide, and the like, e.g. such as disclosed in U.S. Pat. Nos. 4,933,386; 4,343,732; 5,455,292 and RE 36,188 herein and herewith specifically incorporated by reference. The amount of organophosphate fire retardant is selected to achieve the desired final level of fire-retardance. Because of the synergistic effects of utilizing the organoclay additives in the compositions of the invention, the amount of organophosphate fire-retardant can be reduced, and will generally be in the range of 5 to 30% by weight.

The organoclay component comprises one or more organoclay materials. As used herein, organoclay is a layered silicate clay, derived from layered minerals, in which organic structures have been chemically incorporated. Illustrative examples of organic structures are trimethyldodecylammonium ion and N,N'-didodecylimidazolium ion. Since the surfaces of clay layers, which have a lattice-like arrangement, are electrically charged, they are capable of binding organic ions. There is no limitation with respect to the layered minerals employed in this invention other than that they are capable of undergoing an ion exchange with the organic ions. The preferred organoclays are layered minerals that have undergone cation exchange with organo-cations and/or onium compounds. Illustrative of such layered minerals are the kaolinite group and the montmorillonite group. It is also within the scope of this invention to employ minerals of the illite group which can include hydromicas, phengite, brammallite, glaucomite, celadonite and the like. Often, however, the preferred layered minerals include those often referred to as 2:1 layered silicate minerals like muscovite, vermiculite, saponite, hectorite and montmorillonite, wherein montmorillonite is often preferred. The layered minerals described above may be synthetically produced. However, most often they are naturally occurring and commercially available. Organoclays of the type suitable for use in this invention are described in U.S. Pat. Nos. 5,773,502 and 5,530,052 which are incorporated herein by reference.

The mineral component may be a silicate, such as mica, or regular clay or talc.

Other additives can be included in the compositions of the invention in accordance with conventional practice in the art. For example, stabilizers such as sterically hindered phenols, organic phosphites, diazide oxalates, sterically hindered amines or amine N-oxides may be incorporated. Other exemplary additives include ZnS which functions to deactivate residual copper-based catalyst present in PPE, MgO or ZnO which function as an acid quencher to quench acid generated by the deactivation of residual catalyst, and carbon black or other colorant which functions as a pigment to color the composition.

The invention will now be further described with reference to the following, non-limiting examples.

EXAMPLE 1

Samples of glass fiber-reinforced PPE were prepared without organoclay and with various loadings of organoclay. The materials used in each sample are summarized in Table 1, where 0.33 LV PPE refers to a PPE homopolymer prepared by an oxidative coupling process and having an intrinsic viscosity of 0.33; Nirez 2150/7240 is a terpene phenol resin available from Ariz. Chemical Co.; RDP FR is resorcinol diphosphate fire retardant; OCF R22Y K-filament glass fibers are 4 mm long, 14 micron diameter glass fibers sized with an amino silane coupling agent and a urethane film former obtained from Owens-Corning Fiberglas; Mica Suzorite 200HK is a preparation of special delaminated pure phlogopite mica having a median particle size of 45 microns obtained from Zemex Industrial Minerals, Inc.; organoclay CLOISITE 15A is a sodium montmorillonite that has been exchanged with dimethyl hydrogenated ditallow ammonium chloride obtained from Southern Clay Products, Gonzalez, Tex.; and phosphite 168 stabilizer is tris-(2,4-di-t-butylphenyl) phosphite which acts as a thermal stabilizer and antioxidant and which is available from various sources including Argus Chemical, Witco, Great Lakes Chemical and Ciba Geigy Corp. All amounts in the Table are set forth in units of weight.

The samples were compounded in a Werner & Pfleiderer co-rotating intermeshing twin-screw extruder. The extruder has a primary (upstream) melting and mixing section for melting resins and mixing with each other, and mixing mica with the polymer melt, and a secondary (downstream) mixing section for distributive mixing of glass fibers. Thus, glass fibers are added downstream. For the experiments described in this example, the extruder was operated at a temperature of 550° F., and a speed of 350 rpm, to result in polymer production at a rate of 40 lb/hr. After compounding the samples were injection molded using a Van Dorn Demag 120 ton injection molding machine (melt temperature: 560° F., mold temperature: 190° F.) to produce specimens for testing.

standard, such as UL-94 will be passed. The UL-94 protocol calls for bar-shaped specimens of dimensions 5" (12.7 cm)×½" (1.3 cm) width×the desired normal thickness, UL-94 ratings being specified for a particular thickness. A flame having an inner cone of height ¾" (1.9 cm) is applied to each specimen so that a distance of ⅜" (1.0 cm) separates the lower end of the specimen from base of the flame. The flame is held in that position for 10 seconds and then removed. A burn time is defined as the time required for the flame issuing from the specimen to disappear. If burning of the specimen ceases within 30 seconds, the flame is reapplied for an additional 10 seconds. The criteria for V-0, V-1, and V-2 ratings are listed in Table 2.

TABLE 2

Vertical Flame Class Requirements

|  | 94V-0 | 94V-1 | 94V-2 |
|---|---|---|---|
| Individual burn time, seconds | #10 | #30 | #30 |
| Total burn time, seconds (5 specimens × 2) | #50 | #250 | #250 |
| Glowing time, seconds | #30 | #60 | #60 |
| (Individual specimen) Drip particles that ignite cotton | NO | NO | YES |

For a V-0 rating, no individual burn times, from the first or second application may exceed 10 seconds. The total of the burn times for any five specimens may not exceed 50 seconds. Drip particles that ignite a piece of cotton gauze situated below the specimen are not allowed.

For a V-1 rating, no individual burn times, from the first or second application may exceed 30 seconds. The total of the burn times for any five specimens may not exceed 250 seconds. Drip particles that ignite a piece of cotton gauze situated below the specimen are not allowed.

For a V-2 rating, no individual burn times, from the first or second application may exceed 30 seconds. The total of the burn times for any five specimens may not exceed 250 seconds. Drip particles that ignite a piece of cotton gauze situated below the specimen are allowed.

A statistical analysis of the data obtained from a flame test can be applied to determine the probability of at least one

TABLE 1

| Raw Material | Sample 1 | Sample 2 | Sample 3 | Sample 4 | Sample 5 |
|---|---|---|---|---|---|
| 0.33 IV PPE | 53.25 | 53.25 | 53.25 | 53.25 | 53.25 |
| Nirez 2150/7042 | 9 | 9 | 9 | 9 | 9 |
| RDP FR | 12 | 12 | 12 | 12 | 12 |
| OCF R22 K-filament glass fibers | 20 | 19.75 | 19.5 | 19.25 | 15 |
| Mica Suzorite 200 HK | 5 | 5 | 5 | 5 | 5 |
| Organoclay Cloistite ™ 15A | — | 0.25 | .5 | .75 | 5 |
| Phosphite 168 Stabilizer | 0.3 | 0.3 | 0.3 | 0.3 | 0.3 |
| MgO | 0.3 | 0.3 | 0.3 | 0.3 | 0.3 |
| ZnS | 0.15 | 0.15 | 0.15 | 0.15 | 0.15 |
| C Black | 0.5 | 0.5 | 0.5 | 0.5 | 0.5 |
| Total | 100.5 | 100.5 | 100.5 | 100.5 | 100.5 |

The compositions made in Example 1 were tested for flammability using a flame retardance testing tool which provides a prediction of the likelihood that a particular UL possible outcome of the test. Possible outcomes include a first submittal pass, including first time pass and retest, and a second submittal pass, including first time pass and retest, and failure. The probability of at least one outcome, preferably a first time pass on a first submission, provides a measure of the flame retardance of the polymer composition, while minimizing the variability inherent in flame testing, particularly the UL-94 test.

The raw data may be transformed prior to use in the statistical calculations by conversion to equivalent logarithmic values. ("Logarithm" and "logarithmic" refer to base 10 logarithms.) Times less than one second may be rounded up to one second in order to avoid negative logarithmic values. The logarithm of the burn time may then be calculated and used in subsequent steps. Use of transformed data is preferred as a more normal distribution of values associated with burn time is thereby provided. Raw data do not show a normal (bell-shaped) distribution curve because there can be no values less than zero, and data points are typically clustered in the space below the maximum individual burn time. The transformed data, however, more closely fit a normal distribution curve.

The probability of a first time pass may be determined according to the formula:

$$P_{first\ time\ pass} = (P_{t1>mbt,\ n=0} \times P_{t2>mbt,\ n=0} \times P_{total<=mtbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mtbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula:

$$P_{t1>mbt,\ n=0} = (1 - P_{t1>mbt})^5$$

where $P_{t1>mbt}$ is the area under the log normal distribution curve for t1>mbt.

and where the exponent "5" relates to the number of bars tested.

The probability that a single second burn time exceeds a maximum burn time value may be determined from the formula:

$$P_{t2>mbt,\ n=0} = (1 - P_{t2>mbt})^5$$

where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating, the maximum burn time is 30 seconds.

The probability $P_{drip,\ n=0}$ that no specimen exhibits dripping during the flame test is an attribute function, estimated by:

$$(1-P)^5$$

where $P_{drip}$=the number of bars that drip/the number of bars tested.

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V-1 or V-2 rating, the maximum total burn time is 250 seconds.

The probability of a retest is determined according to the following formula:

$$P_{retest} = (P_{t1>mbt,\ n=1} \times P_{t2>mbt,}$$

$$n=0 \times P_{total<=mtbt} \times P_{drip,\ n=0}) +$$

$$(P_{t1>mbt,\ n=0} \times P_{t2>mbt,\ n=1}$$

$$\times P_{total<=mtbt} \times P_{drip,\ n=0}) +$$

$$(P_{t1>mbt,\ n=0} \times P_{t2>mbt,\ n=0}$$

$$\times P_{mtbt<total<=mrtbt} \times P_{drip,\ n=0}) +$$

$$(P_{t1>mbt,\ n=0} \times P_{t2>mbt,\ n=0}$$

$$\times P_{total<=mtbt} \times P_{drip,\ n=1})$$

where $P_{t1>mbt,\ n=1}$ is the probability that a single first burn time exceeds a maximum burn time value, $P_{t2>mbt,\ n=1}$ is the probability that a single second burn time exceeds a maximum burn time value, $P_{mtbt<total<=mrtbt}$ is the probability that the sum of individual burn times is greater than the maximum total burn time value and is less than or equal to the maximum retest total burn time value, $P_{drip,\ n=1}$ is the probability that a single specimen exhibits dripping during the flame test and $P_{t1>mbt,\ n=0}$, $P_{t2>mbt,\ n=0}$, $P_{total<=mtbt}$, and $P_{drip,\ n=0}$, are as defined above.

The probability that a single first burn time exceeds a maximum burn time value may be determined from the formula:

$$P_{t1>mbt,\ n=1} = 5 \times P_{t1>mbt} \times (1 - P_{t1>mbt})^4$$

where $P_{t1>mbt}$ is defined as above.

The probability that a single second burn time exceeds a maximum burn time value may be determined from the formula:

$$P_{t2>mbt,\ n=1} = 5 \times P_{t2>mbt} \times (1 - P_{t2>mbt})^4$$

where $P_{t2>mbt}$ is defined above.

The probability that the sum of individual burn times is greater than the maximum total burn time value and is less than or equal to the maximum retest total burn time value may be determined from the normal distribution curve of simulated 5-bar total times, as described above for $P_{total<=mtbt}$. $P_{mtbt<total<=mrtbt}$ is equal to the area under a log normal distribution curve of a set of 1000 Monte Carlo simulated 5-bar total burn time for maximum total burn time<total<= the maximum retest total burn time value. For the UL-94 V-0 rating, the maximum total burn time is 50 seconds, and the maximum retest total burn time value is 55 seconds. For a V-1 or V-2 rating, the maximum total burn time is 250 seconds, and the maximum retest total burn time value is 255.

The probability that a single specimen exhibits dripping during the flame test may be estimated from the following attribute function:

$$P_{drip,\ n=1} = 5 \times P_{drip} \times (1 \times P_{drip})^4$$

where $P_{drip}$ is defined as for a first time pass, above.

By definition, the sum of the probabilities of possible outcomes of a first submittal is one:

$$\Sigma(Probabilities) = P_{first\ time\ pass} + P_{retest} + P_{failure,\ no\ retest} = 1.$$

Therefore, the probability of a failure is given by:

$$P_{failure,\ no\ retest} = 1 - P_{first\ time\ pass} - P_{retest}$$

The probability of a first submittal pass is given by:

$$P_{1st\ submittal\ pass} = P_{first\ time\ pass} + P_{retest} \times P_{first\ time\ pass}$$

where $P_{first\ time\ pass}$ and $P_{retest}$ are as defined above.

The probability of a second submittal pass is determined according to:

$$P_{2nd\ submittal\ pass} = P_{failure,\ no\ retest} \times (P_{first\ time\ pass} + P_{retest} \times P_{first\ time\ pass})$$

where $P_{first\ time\ pass}$, $P_{retest}$ and $P_{failure,\ no\ retest}$ as defined above.

Finally, the probability of a pass after a first and second submittal, or the overall probability of a pass is:

$$P_{overall\ pass} = P_{1st\ submittal\ pass} + P_{2nd\ submittal\ pass}$$

Using this procedure, each of the compositions of Table 1 were evaluated, and the results are summarized in Table 3. As shown, compositions containing mineral filler and organoclay in an amount of from 0.5 to 0.75% by weight had very good flame retardance properties and high likelihood of passing the UL-94 tests. Compositions with lower levels of organoclay worked less well, while compositions with 5% by weight exhibited a deterioration in performance.

EXAMPLE 2

The experiments of Examples 1 were repeated using samples with and without mineral filler in accordance with the compositions set forth in Table 4 and tested for flame retardance characteristics. In these compositions, the importance of mineral filler with various levels of the organoclay component was tested. As shown, the presence of both the organoclay and the mineral filler result in the best flame-retardance properties.

TABLE 3

| Test | Sample 1 | Sample 2 | Sample 3 | Sample 4 | Sample 5[1] |
|---|---|---|---|---|---|
| t1 – Total Flame-Out Time, 1st Flame Application (sec) | 34 | 36 | 28 | 36 | 880 |
| t2 – Total Flame-Out Time, 2nd Flame Application (sec) | 84 | 81 | 51 | 59 | — |
| ti + t2 (sec) | 118 | 117 | 79 | 95 | — |
| Average Flame-Out time (sec) | 3 | 2.9 | 2 | 2.4 | — |
| Standard Deviation (Flame-Out time, sec) | 3 | 2.2 | 1.4 | 1.5 | — |
| Probability of Passing UL94 V0 rating on 1st submittal of 5 flame bars | 0.80 | 0.85 | 0.98 | 0.93 | 0 |

Notes:
[1]Sample 5 burned completely when the flame was applied the first time. Thus a second flame application was not possible. A consequence of this was that t1 – total flame out time, first application (sec.) was 880 second, and t2 could not be calculated.

TABLE 4

| Raw Material | Samp. 6 | Samp. 7 | Samp. 8 | Samp. 9 | Samp. 10 | Samp. 11 | Samp. 12 | Samp. 13 |
|---|---|---|---|---|---|---|---|---|
| 0.33 IV PPE | 60.25 | 60 | 59.75 | 59.5 | 60.25 | 60 | 59.75 | 59.5 |
| Nirez 2150/7042 | 9 | 9 | 9 | 9 | 9 | 9 | 9 | 9 |
| RDP FR | 10 | 10 | 10 | 10 | 10 | 10 | 10 | 10 |
| OCP R22 K-filament glass fibers | 15 | 15 | 15 | 15 | 20 | 20 | 20 | 20 |
| Mica Suzorite 200 HK | 5 | 5 | 5 | 5 | | | | |
| Organoclay Cloistite ™ 15A | — | 0.25 | .5 | .75 | — | 0.25 | .5 | .75 |
| Phosphite 168 Stabilizer | 0.3 | 0.3 | 0.3 | 0.3 | 0.3 | 0.3 | 0.3 | 0.3 |
| MgO | 0.3 | 0.3 | 0.3 | 0.3 | 0.3 | 0.3 | 0.3 | 0.3 |
| ZnS | 0.15 | 0.15 | 0.15 | 0.15 | 0.15 | 0.15 | 0.15 | 0.15 |
| C Black | 0.5 | 0.5 | 0.5 | 0.5 | 0.5 | 0.5 | 0.5 | 0.5 |
| Total | 100.5 | 100.5 | 100.5 | 100.5 | 100.5 | 100.5 | 100.5 | 100.5 |
| Test | | | | | | | | |
| t1 – Total Flame-Out Time, 1st Flame Application (sec) | 43 | 36 | 35 | 52 | 96 | 64 | 63 | 84 |
| t2 – Total Flame-out Time, 2nd Flame Application (sec) | 76 | 43 | 48 | 82 | 72 | 102 | 122 | 173 |
| t1 + t2 (sec) | 119 | 79 | 83 | 134 | 168 | 166 | 185 | 257 |
| Average Flame-out Time (sec) | 3 | 2 | 2.1 | 3.4 | 4.2 | 4.2 | 4.6 | 6.4 |
| Standard Deviation (Flame-Out Time, sec) | 1.9 | 1.2 | 1.1 | 3 | 3.9 | 4.3 | 3.5 | 7.4 |
| Probability of Passing UL94 V0 rating on 1st submittal of 5 flame bars | 0.90 | 0.99 | 0.98 | 0.75 | 0.58 | 0.40 | 0.27 | 0.04 |

Note to Table 4: The total loading of glass fiber and mica was kept constant at 20 weight percent which enabled studying the effect of replacing glass fibers by mica.

What is claimed is:

1. A composition comprising:
   (a) a polymer component comprising at least 50% by weight of polyphenylene ether;
   (b) 5 to 50 weight percent glass reinforcing fibers;
   (c) 5 to 30 weight percent of an organophosphate fire retardant;
   (d) 0.25 to 0.75 weight percent of an organoclay component, wherein the organoclay component is a layered mineral that has undergone cation exchange with organo-cations and/or onium ions;
   (e) 5 weight percent of mica; and
   (f) a terpene phenol resin; wherein all weight percents are based on the total weight of the composition.

2. The composition of claim 1, wherein the organophosphate fire retardant is resorcinol diphosphate.

3. An injection-molded article fanned from a glass fiber-reinforced polyphenylene ether composition, wherein the glass fiber-reinforced polyphenylene ether composition comprises:
   (a) a polymer component comprising at least 50% by weight of a polyphenylene ether;
   (b) 5 to 50 weight percent glass reinforcing fibers;
   (c) 5 to 30 weight percent of an organophosphate fire retardant;
   (d) 0.25 to 0.75 weight percent of an organoclay component, wherein the organoclay component is a layered mineral that has undergone cation exchange with organo-cations and/or onium ions;
   (e) 5 weight percent of mica; and
   (f) a terpene phenol resin;
   wherein all weight percents are based on the total weight of the composition.

4. A method for making a glass fiber-reinforced polyphenylene ether composition, comprising:
   preparing a mixture by combining the following ingredients:
   (a) a polymer component comprising at least 50% by weight of a polyphenylene ether;
   (b) 5 to 50 weight percent glass reinforcing fibers;
   (c) 5 to 30 weight percent of an organophosphate fire retardant;
   (d) 0.25 to 0.75 weight percent of an organoclay component, wherein the organoclay component is a layered mineral tat has undergone cation exchange with organo-cations and/or onium ions;
   (e) 5 weight percent of mica; and
   (f) a terpene phenol resin;
   wherein all weight percents are based on the total weight of the composition; and compounding the mixture to blend the ingredients into a uniform composition.

5. A composition comprising:
   (a) a polymer component comprising at least 50% by weight of polyphenylene ether;
   (b) 5 to 50 weight percent glass reinforcing fibers;
   (c) 5 to 30 weight percent of an organophosphate fire retardant;
   (d) 0.25 to 0.75 weight percent of an organoclay component, wherein the organoclay is prepared from a layered mineral selected from the group consisting of kaolin, montmorillonite, hectorite, saponite, vermiculite, muscovite, hydronilca, phengite, bramxnalite, glaucomite, and celadonite by ion exchange with an organo-cation selected from the group consisting of dimethyl hydrogenated ditallow ammonium, trimethyldodecylammonium, and N,N'-didodecylimidazolinium cations;
   (e) 5 weight percent of mica; and
   (f) a terpene phenol resin;
   wherein all weight percents are based on the total weight of the composition.

6. A method for making a glass fiber-reinforced polyphenylene ether composition, comprising the steps of:
   preparing a mixture by combining the following ingredients:
   (a) a polymer component comprising at least 50% by weight of a polyphenylene ether;
   (b) 5 to 50 weight percent glass reinforcing fibers;
   (c) 5 to 30 weight percent of an organophosphate fire retardant;
   (d) 0.25 to 0.75 weight percent of an organoclay component, wherein the organoclay is prepared from a layered mineral selected from the group consisting of kaolin, montmorillonite, hectorite, saponite, vermiculite, muscovite, hydromica, phengite, brammalite, glaucomite, and celadonite by ion exchange with an organo-cation selected from the group consisting of dimethyl hydrogenated ditallow ammonium, trimethyldodecylammonium, and N,N'-didodecylimidazolinium cations;
   (e) 5 weight percent of mica; and
   (f) a terpene phenol resin;
   wherein all weight percents are based on the total weight of the composition; and
   compounding the mixture to blend the ingredients into a uniform composition.

7. A composition comprising:
   (a) a polymer component comprising at least 50% by weight of polyphenylene ether;
   (b) 5 to 50 weight percent glass reinforcing fibers;
   (c) 5 to 30 weight percent of an organophosphate fire retardant;
   (d) 0.25 to 0.50 weight percent of an organoclay component, wherein the organoclay component is a layered mineral that has undergone cation exchange with organo-cations and/or onium ions; and
   (e) 5 weight percent of mica; and
   (f) a terpene phenol resin;
   wherein all weight percents are based on the total weight of the composition.

8. A composition comprising:
   (a) 53 to 60 weight percent of polyphenylene ether;
   (b) 5 to 50 weight percent glass reinforcing fibers;
   (c) 5 to 30 weight percent of an organophosphate fire retardant;
   (d) 0.25 to 0.75 weight percent of an organoclay component wherein the organoclay component is a layered mineral that has undergone cation exchange with organo-cations and/or onium ions;
   (e) 5 weight percent of mica; and
   (f) a terpene phenol resin;
   wherein all weight percents are based on the total weight of the composition.

9. A composition comprising:
   (a) a polymer component comprising at least 50% by weight of polyphenylene ether;

(b) 5 to 50 weight percent glass reinforcing fibers;

(c) 5 to 30 weight percent of an organophosphate fire retardant;

(d) 0.25 to 0.75 weight percent of an organoclay component, wherein the organoclay component is a layered mineral tat has undergone cation exchange with organo-cations and/or onium ions;

(e) 5 weight percent of mica and (f) a terpene phenol resin;

wherein all weight percents are based on the total weight of the composition; and wherein the composition has a 0.75–0.99 probability of passing UL-94 V0 rating on a first submittal of five flame bars.

10. The composition of claim 9, wherein the composition comprises 0.25% by weight of the organoclay, and wherein die probability of passing UL-94 V0 rating on a first submittal of five flame bars is 0.99.

11. The composition of claim 9, wherein the composition comprises 0.50% by weight of the organoclay, and wherein the probability of passing UL-94 V0 rating on a first submittal of five flame bars is 0.98.

12. The composition of claim 9, wherein the composition comprises 0.75% by weight of the organoclay, and wherein the probability of passing UL-94 V0 rating on a first submittal of five flame bars is 0.75.

* * * * *